(12) United States Patent
Filman et al.

(10) Patent No.: US 10,015,155 B2
(45) Date of Patent: *Jul. 3, 2018

(54) RESOURCE-BASED ACTION ATTRIBUTION

(71) Applicant: Microsoft Technology Licensing, LLC, Redmond, WA (US)

(72) Inventors: Sarah Filman, Bellevue, WA (US); Jonathan A. Bockelman, Kirkland, WA (US); Daron Spektor, Seattle, WA (US); Arcadiy Gregory Kantor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,902

(22) Filed: Feb. 9, 2017

(65) Prior Publication Data

US 2017/0155632 A1 Jun. 1, 2017

Related U.S. Application Data

(63) Continuation of application No. 13/800,522, filed on Mar. 13, 2013, now Pat. No. 9,600,669.

(51) Int. Cl.
*G06F 7/04* (2006.01)
*H04L 29/06* (2006.01)
*G06F 21/62* (2013.01)

(52) U.S. Cl.
CPC .............. *H04L 63/08* (2013.01); *G06F 21/62* (2013.01); *H04L 63/101* (2013.01); *H04L 63/102* (2013.01)

(58) Field of Classification Search
CPC ...... G06F 21/31; G06F 21/6218; G06C 50/01; H04L 63/08; G06Q 50/01
See application file for complete search history.

(56) References Cited

U.S. PATENT DOCUMENTS

2003/0225834 A1* 12/2003 Lee ...................... G06Q 10/107
709/204
2010/0241711 A1* 9/2010 Ansari ................... G06Q 30/04
709/205

(Continued)

OTHER PUBLICATIONS

Rochelle, Jonathan, "See Shared Docs & Spreadsheets Before Logging In", Published on: Jun. 6, 2007, Available at: http://googledrive.blogspot.in/2007/06/see-shared-docs-spreadsheets-before.html, 1 page.

(Continued)

*Primary Examiner* — Khoi V Le
(74) *Attorney, Agent, or Firm* — Holzer Patel Drennan

(57) ABSTRACT

A system of resource-based action attribution provides a mechanism for tracking actions performed on a resource shared among multiple users of a resource sharing system, whether the users are authenticated within the resource sharing system or not. The tracking mechanism may allow users to track identifying information of other users who perform actions (e.g., editing actions) on the shared resource. A user can access a resource by providing a resource identifier and/or an access credential associated with the resource. The user's actions on the resource can be associated with an invitee identifier (e.g., an email address) that is associated in memory with the resource identifier and/or the access credential.

20 Claims, 6 Drawing Sheets

(56) References Cited

U.S. PATENT DOCUMENTS

| | | | | |
|---|---|---|---|---|
| 2010/0250704 | A1* | 9/2010 | Kittel | G06F 21/10 709/219 |
| 2010/0319062 | A1* | 12/2010 | Danieli | H04L 12/1818 726/7 |
| 2011/0219371 | A1 | 9/2011 | Eide et al. | |
| 2011/0276897 | A1* | 11/2011 | Crevier | G06Q 10/107 715/752 |
| 2011/0319148 | A1 | 12/2011 | Kinnebrew et al. | |
| 2012/0317280 | A1 | 12/2012 | Love et al. | |
| 2013/0046833 | A1* | 2/2013 | Riepling | H04L 67/06 709/206 |
| 2014/0033265 | A1* | 1/2014 | Leeds | G06F 21/10 726/1 |
| 2014/0282921 | A1* | 9/2014 | Filman | G06F 9/468 726/5 |

OTHER PUBLICATIONS

Johnson, et al., "Laissez-faire File Sharing", Retrieved at «http://research.microsoft.com/pubs/81057/nspw.pdf» In Proceedings of the Workshop on New Security Paradigms Workshop, Sep. 8, 2009, pp. 9.

Janakiraman, Shamila, "CCS Picks SkyDox Cloud-Enabled File Sharing and Collaboration Tools", Retrieved at «http://outbound-call-center.tmcnet.com/topics/hosted-call-center/articles/291596-ccs-picks-skydox-cloud-enabled-file-sharing-collaboration.htm» May 23, 2012, pp. 2.

Katrulya, Jennifer, "6 Online Document Transfer and Storage Options for Accountants", Retrieved at «http://blog.accountants.intuit.com/proadvisor-newsletter-content/6-online-document-transfer-and-storage-options-for-accountants/» Aug. 15, 2012, pp. 4.

Krishnadas, Sajesh, "Vembu Online Data Backup Expert Managed File Sharing and Collaboration in the Cloud", Retrieved at «http://www.backupreview.info/» Jan. 11, 2013, pp. 59.

"HybridCloud Access and Storage", Retrieved at «http://www.egnyte.com/file-server/online-file-server-features.html» Retrieved Date: Jan. 17, 2013, pp. 7.

OpenText Tempo™ Box, Retrieved at «http://www.opentext.com/2/global/products/products-document-management/products-opentext-tempo.htm» Retrieved Date: Jan. 17, 2013, pp. 2.

"Simple File Sharing, Access Control and Version Management", Retrieved at «http://www.egnyte.com/file-sharing/online-file-sharing.html» Retrieved Date: Jan. 17, 2013, pp. 4.

"Syncplicity", retrieved at «http://www.syncplicity.com/pdfs/business_edition_product_guide.pdf» Retrieved Date: Jan. 17, 2013, pp. 35.

International Searching Authority, U.S. Patent and Trademark Office; International Search Report and Written Opinion for PCT/US2014/020452, dated Jun. 6, 2014, 9 pages.

International Preliminary Examining Authority, U.S. Patent and Trademark Office, Second International Written Opinion for PCT/US2014/020452, dated Jul. 27, 2015, 7 pages.

International Preliminary Report on Patentability, U.S. Patent and Trademark Office, for PCT/US2014/020452, dated Oct. 21, 2015, 17 pages.

\* cited by examiner

RESOURCE-BASED ACTION ATTRIBUTION

The present application is a continuation of and claims benefit of U.S. patent application Ser. No. 13/800,522 filed Mar. 13, 2013 titled "RESOURCE-BASED ACTION ATTRIBUTION", which is specifically incorporated by reference for all that it discloses and teaches.

BACKGROUND

When multiple users collaborate on a shared resource, each user typically authenticates with an authentication system in order to access the resource. For example, if multiple users collaborate to edit a shared document, each user is likely to log into a resource sharing system (e.g., a file sharing system) to access and edit the shared document in accordance with their access permissions.

In some resource sharing environments, collaborators may share the resource with another user outside the resource sharing system (e.g., with a user who does not have accounts within the resource sharing system). Such circumstances do not provide an attribution mechanism to allow the resource sharing system users to identify the outside users and/or track actions made by the outside users on the resource.

SUMMARY

Implementations described and claimed herein address the foregoing problems by providing a mechanism for tracking modifications of a shared resource made by various users of a resource sharing system, whether the users are authenticated within the resource sharing system or not. In particular, the tracking mechanism may allow users to track identifying information of other users who perform actions (e.g., editing actions) on the shared resource without logging in to an account of the resource sharing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
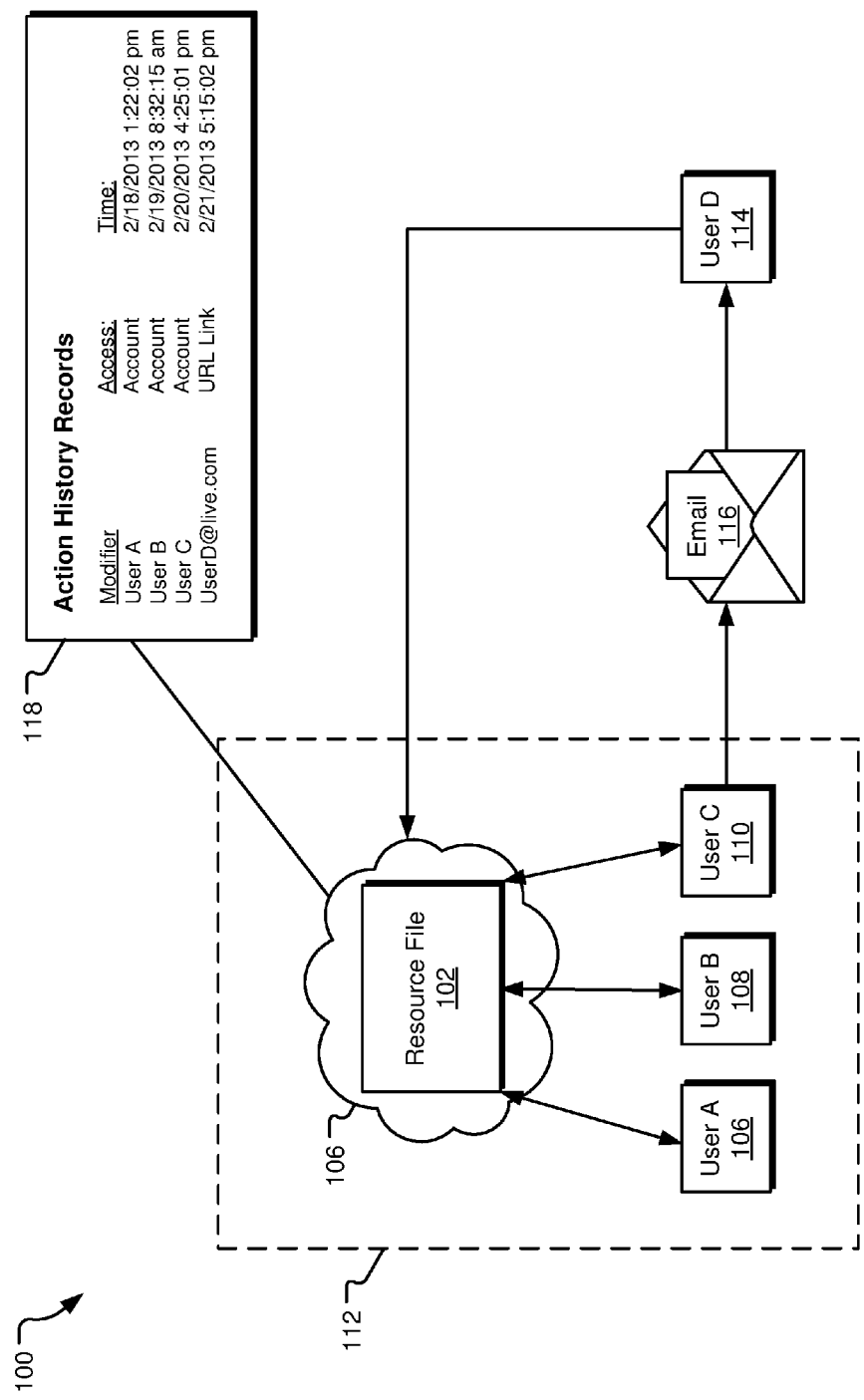
FIG. 1 illustrates an example resource-based action attribution system.

FIG. 1 illustrates an example resource-based action attribution system 100. The resource-based attribution system 100 includes a resource (e.g., a shared file 102) hosted by a collaboration server (not shown), in association with a resource sharing system 112. Both the resource sharing system 112 and the collaboration server may be cloud-based, or may otherwise be networked through a local area network (LAN), a wide area network (WAN), etc. Users (e.g., User A 106, User B 108, and User C 110) have created individual accounts within the resource sharing system 112. By logging into their respective accounts, the users are able to collaboratively share and edit documents in accordance with their corresponding access permissions for each document.

To share a resource over the resource sharing system 112, a sharing user may designate other users to have access permissions (e.g., read, write, sharing, executable access) of the shared resource. The sharing user and the users designated by the sharing user are referred to herein as "resource collaborators." If the resource collaborators have accounts within the resource sharing system 112, the sharing user can initially grant access permissions in a variety of ways, including without limitation by specifying the account identifiers of designated resource collaborators or by emailing each of the designated resource collaborators a URL to the shared resource on the sharing system 112.

For example, the sharing user may give other users access to a resource by specifying, to the resource sharing system 112, a login name corresponding to an account on the resource sharing system 112. A user with the appropriate account credentials may then access the resource by logging into the account corresponding to the specified login name. Alternatively, the sharing user may give another user access to the shared resource by emailing the user a resource identifier (e.g., a URI, URL, GUID) to the resource. After selecting the resource identifier, the user may be prompted to provide account information to access the shared resource.

However, in some situations, a sharing user may wish to share the resource with another user who does not have an account on the resource sharing system 112. In such a case, the resource-based action attribution system 100 provides a mechanism for group resource sharing that gives resource collaborators the ability to track attribution data relating to actions performed on shared resources without requiring each user performing such actions to create or log on to a personal account of the resource sharing system 112. Such resource collaborators may be identified by the sharing user using an invitee identifier, which identifies the resource collaborator with a reference that is external to the resource sharing system 112 (e.g., an external email address).

An external user identifier is not associated with an account within the resource sharing system 112. In contrast, an internal user identifier is associated with an account within the resource sharing system 112. Furthermore, attribution data refers to data relating to actions (e.g., editing actions) performed on a shared resource, including without limitation resource identifiers, invitee identifiers, (internal) user identifiers within a resource sharing system, timestamps, date stamps, action descriptors, permissions relating to access, and/or permissions relating to the right to invite others to access the shared resource.

Using the resource-based action attribution system 100, a resource collaborator can access a resource by redeeming an access credential (not shown), such as an authentication key. The access credential is associated with one or more resources and also with one or more invitee identifiers (such as a name or email address of an individual granted access to the resource). To redeem the access credential and acquire authorized access to the resource, the resource collaborator can submit the access credential to the resource sharing system 112. As a result of such redemption, the resource collaborator may perform actions on the resource (e.g., reading and editing actions). The resource-based action attribution system 100 detects the actions performed on the resource and logs them in one or more datastores referred to as action history records 118.

The access credential may be public or private, and may be acquired in a variety of different ways. In the implementation illustrated in FIG. 1, the access credential is sent in an invite 116 from a sharing user with permission to share a resource file (e.g., a User C 110) to another resource collaborator (e.g., a User D 114) (the "invitee), who may or may not have an account on the resource sharing system 112.

In one implementation, the invite 116 is a notification that includes the access credential (e.g., an authentication key) and/or a resource identifier (e.g., a URI, URL, or GUID associated with the shared file 102). The notification may assume a variety of forms such as an email, text message, social networking notification, etc. For example, the invite 116 may contain a resource identifier that includes an authentication key. The invitee can click on or select the resource identifier to gain access to the shared file 102. Alternatively, the invite 116 may contain an access credential that the invitee types into a prompt of the resource-based attribution system 100. Further still, the invite 116 may contain a resource identifier that does not include an access credential. The invitee may utilize the resource identifier to access the shared file 102 without providing an access credential. Alternatively, the invitee may utilize the resource identifier to access a portal that prompts the invitee for an access credential.

In yet another implementation, the access credential can be acquired by visiting a public or private website. For example, the website may post a resource identifier and/or an access credential, such as an authentication key, that a user may utilize to access or modify the shared file 102. In one implementation, the resource identifier includes the authentication key or is otherwise associated with the authentication so that the invitee can access the shared resource.

The access credential may be generated in a variety of ways. In one implementation, the sharing user obtains the access credential by providing the resource sharing system 112 with an invitee identifier associated with an intended invitee. The invitee identifier may assume a variety of forms, such as an email address, instant messaging screen name, social networking account identifier, personal website, etc. The resource sharing system 112 generates the access credential and associates the access credential in memory with both the invitee identifier and one or more shared resources of the resource sharing system 112 (see, e.g., a table 208 in FIG. 2).

In the implementation where the access credential is sent in the form of an invite 116, the invite 116 may be generated in a variety of ways. In one example implementation, the User C 110 initiates an invite transmittal process by using a graphical user interface (GUI) tool of the resource sharing system 112. The User C 110 performs an action (such as selecting a radio button, drop-down option, etc.), and the resource-based action attribution system 100 prompts the User C 110 for the invitee's email address (an example invitee identifier). The User C 110 types the email address of User D 114 (e.g., UserD@live.com) into the prompt, and the resource sharing system 112 generates a resource identifier to the resource file 102. The resource identifier includes an authentication key. Thereafter, the system or the User C 110 sends an invite 116 in the form of an email to User D 114 that includes a URL containing the authentication key.

In yet another implementation, a resource collaborator can access a shared resource without an access credential by utilizing a resource identifier. For example the resource collaborator may visit a public or private website that includes a link to the shared resource. The resource identifier may be associated in memory with another identifier (e.g., an invitee identifier) that may be subsequently associated with actions (e.g., editing actions) performed on the shared resource.

In yet another implementation, a resource collaborator who wishes to access a shared resource may acquire an access credential for a resource by providing his or her own invitee identifier. For example, a resource may be made accessible via a public or semi-public website to a user who provides an email address or other self-identifying information. In one such implementation, the user provides an email address and the resource-based action attribution system 100 generates an access credential, such as an authentication key, that the user can subsequently use to access the resource.

The access credential may be stored in one or more memory locations in association with the invitee identifier, one or more resources, and one or more resource identifiers (e.g., URLs) accessible via the access credential. Therefore, the resource-based action attribution system 100 can retrieve the one or more invitee identifiers and resource identifiers associated with a given access credential at the time that the access credential is redeemed.

The resource-based action attribution system 100 also provides a mechanism for resource collaborators to track actions performed on a shared resource (e.g., attribution actions), including edits made by users who did not log in to the resource sharing system 112. The resource-based action attribution system 100 includes one or more modules for tracking attribution data, including without limitation timestamp, revision, and/or invitee identifiers associated with each edit of the shared resources. Attribution data is stored, for example, in one or more sharing lists, files, tables, etc., which are hereinafter collectively referred to as "action history records."

In the illustrated implementation, the resource-based action attribution system 100 keeps action history records 118 that includes records relating to each of four editing instances of the resource by four different users (i.e., User A, User B, User C, and a fourth user identified by an email address "UserD@live.com"). An "editing instance" refers to one or more actions performed by a resource collaborator during a time interval initiated when access to a resource is granted, whether such access is acquired by redemption of an access credential or otherwise. An editing instance terminates when the file collaborator closes the resource or takes other action to indicate that he is finished modifying or accessing the resource, or delaying further actions (e.g., editing, reading, etc.) on the resource until a later point in time.

With reference to the action history records 118, the first record indicates that revisions were made by "User A" at 1:22:02 pm on Feb. 18, 2012. Although not illustrated by the action history records 118, the resource sharing system 112 may also keep a comprehensive revision history of specific editing actions associated with each editing instance.

In addition to action history data relating to account users of the resource sharing system 112, the action history records 118 also includes records relating to resource collaborators who accessed the resource file 102 without logging into an account. For example, the action history records 118 includes an entry associated with one or more revisions performed by User D 114, who accessed the resource file 102 by selecting a resource identifier embedded in the email invite 116. Because the resource identifier includes an access credential, such as an authentication key, the resource-based action attribution system 100 is to able provide access to the resource, retrieve an invitee identifier (e.g., User D's email address UserD@live.com) associated with the access credential (e.g., from a datastore such as the table 208 in FIG. 2), and further associate that invitee identifier with revisions made by the User D during the editing instance that commenced when User D selected the resource identifier in the invite 116. The invitee identifier and revisions of the associated editing instance may be stored in the action history records 118.

In another implementation, a single access credential and/or resource identifier allows more than one invitee to gain access to the shared file 102. For example, other users (e.g., users E, F, and G (not shown)) may access the shared file 102 with the same resource identifier as the user D. Revisions made by such other users may be associated with the User D in the action history records 118.

Figure 2:
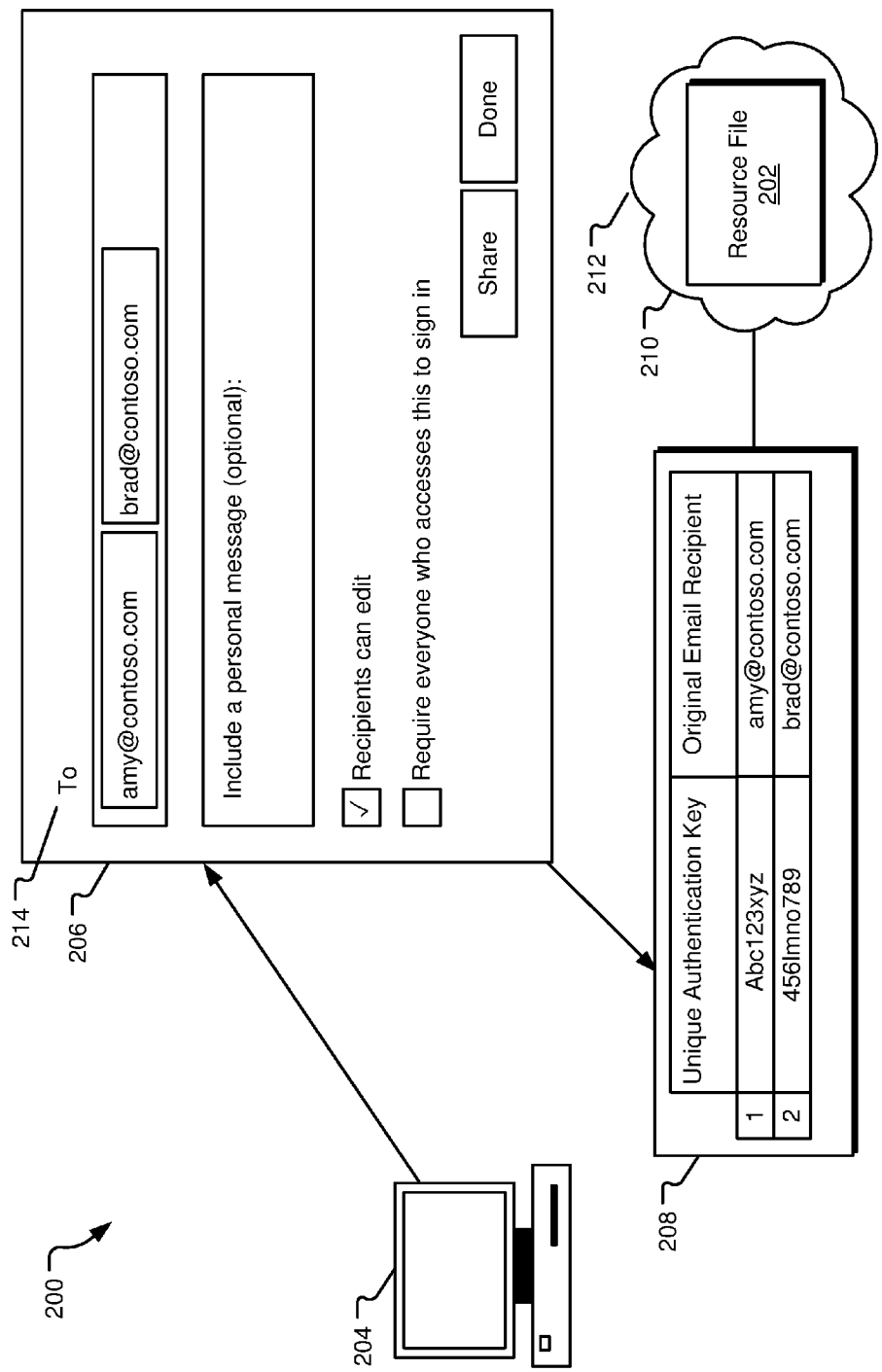
FIG. 2 illustrates an invite providing a user with access to a resource using an example resource-based action attribution system.

FIG. 2 illustrates an invite providing a user with access to a resource (e.g., a resource file 202) using an example resource-based action attribution system 200 (i.e., the system 200). A sharing user (not shown) can use a processor 204, such as a processor of a computer, smart-phone, tablet, or other electronic device, to invite an invitee to access a shared resource file 202 using a resource sharing system 212.

The sharing user initiates an invitation process to one or more invitees by selecting a resource-sharing option associated with the resource file 202 of the system 200. For example, the sharing user may initiate the invitation process by selecting a resource sharing option in a drop-down menu of a GUI interface of the system 200. In response to the sharing user's selection of the resource-sharing option, the system 200 provides the sharing user with a prompt 206 requesting an invitee identifier (which is, in this case, an email address) for each of the invitees. In another implementation, the prompt 206 requests that the sharing user provide a social network identifier, such as a screen name, for each of the invitees. Other invitee identifiers may be employed.

In the implementation shown, the sharing user provides the email addresses of his two friends, Amy and Brad, by typing Amy and Brad's email addresses into a "To" field 214 in the prompt 206. The sharing user may elect whether the invitees (Amy and Brad) are to be asked to log in to the resource sharing system 212 before modifying the resource file 202. In FIG. 2, the sharing user indicates that the invitees are to be granted permission to edit the resource file 202 without logging in to the resource sharing system 212 by checking the box "Recipients can edit" and not checking the box "Require everyone who accesses this to sign in." The sharing user can optionally include a personal message to the invitees and may send an invitation to the invitees (Amy and Brad) by clicking the 'share' button on the prompt 206.

When the sharing user selects the 'share' button or performs another share-initiating action, the system 200 generates an access credential, such as an authentication key, in association with each of the invitees, as shown in a table 208. The table 208 represents a stored association among the access credential, the invitee identifier, and the resource file 202. The system 200 may also generate a resource identifier to access the resource file 202. In one implementation, a unique resource identifier is generated for each of the specified invitees, with each resource identifier including an authentication key associated with a corresponding invitee (e.g., the authentication keys shown in table 208).

The system 200 sends each invitee the appropriate authentication key and/or the resource identifier, and the invitee can then access the resource file 202 by selecting the resource identifier or otherwise utilizing the authentication key. The system 200 saves the invitee identifier (e.g., the email address) of each of the invitees with the corresponding unique authentication key in the table 208, such that a subsequent attempt to access the resource file 202 using the authentication key can be associated with the invitee identifier of the corresponding invitee.

In another implementation, the sharing user selects the "share" button or performs another sharing action and the system 200 generates a resource identifier associated with the resource file 202. Using the resource identifier, the invitee can access the resource without providing an access credential. The system 200 may save the resource identifier in a memory location in association with one or more invitee identifiers, such that a subsequent attempt to access the resource file 202 using the resource identifier can be associated with the invitee identifiers.

Figure 3:
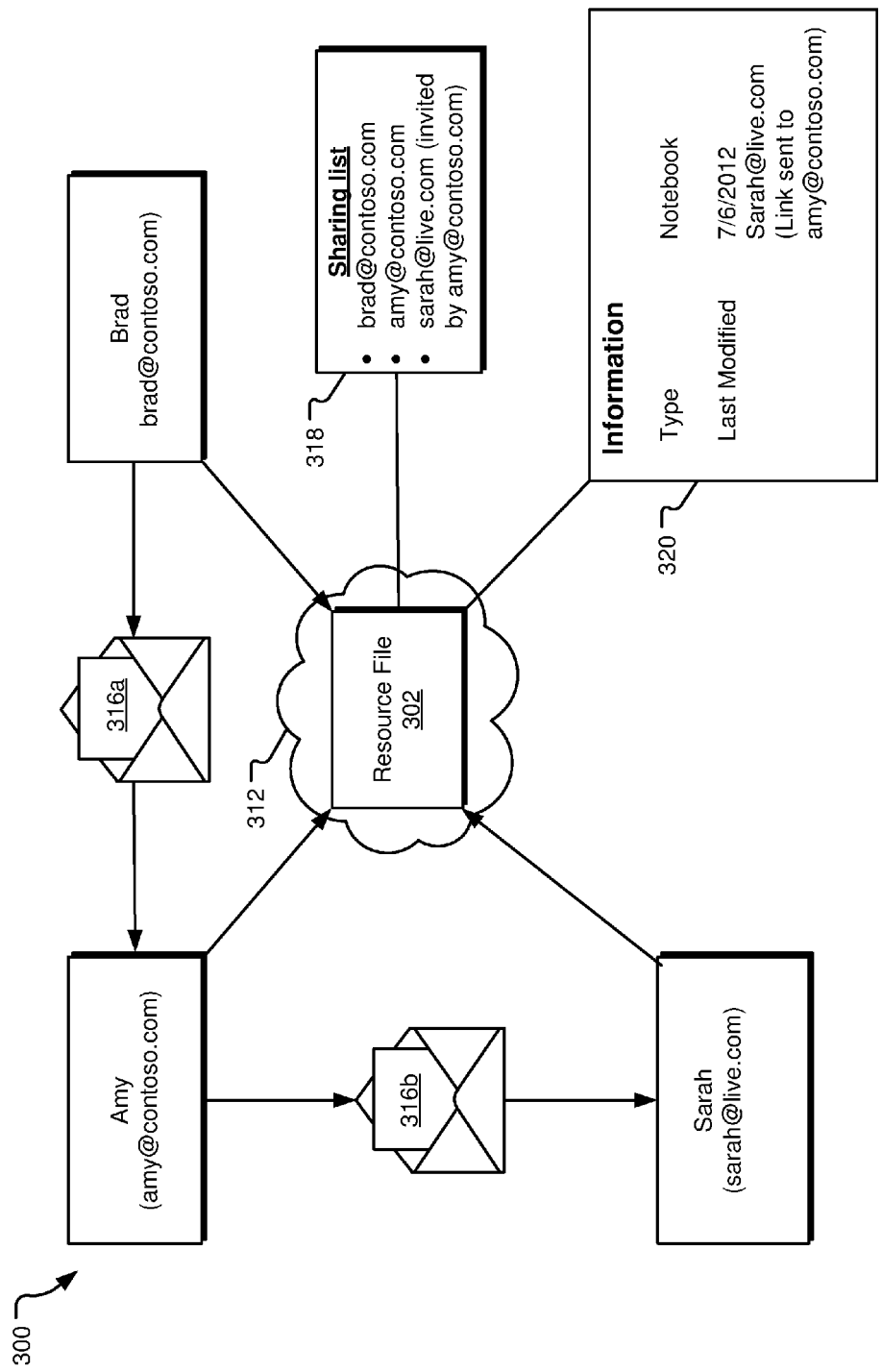
FIG. 3 illustrates a mechanism for tracking actions (e.g., editing actions) of a user accessing a shared resource using another example resource-based action attribution system.

FIG. 3 illustrates a mechanism for tracking actions (e.g., editing actions) of a user accessing a shared resource using another example resource-based action attribution system 300 (i.e., the system 300). The system 300 includes a shared resource (e.g., a resource 302) on a resource sharing system 312, and a number of resource collaborators (e.g., Brad, Amy, and Sarah). In the illustrated example, Brad (one of the resource collaborators) has permission to share the resource 302 on the resource sharing system 312. Brad sends an invite 316a to an invitee, Amy, who can use information in the invite 316a to access or modify the resource 302 without logging in to an account on the resource sharing system 312.

The invite 316a that Amy receives can be created in the same or a similar manner to that illustrated and described with respect to FIG. 2. The invite 316a may take on a variety of forms (e.g., an email, text message, social networking notification, etc.) and may include an access credential (e.g., an authentication key). The access credential is stored in a memory location of the system 300 in association with an invitee identifier relating to the invitee (i.e., Amy). In this case, the invitee identifier is Amy's email address "amy@contoso.com," specified by Brad when he sent the invite 316a to Amy. The access credential is also associated in memory with one or more resources on the resource sharing system 312.

In one implementation, the invite 316a includes a resource identifier including an authentication key, which the invitee can select or click on to edit the resource 302. In another implementation, the invite 316a includes the authentication key and directions on how to access the resource 302 and/or a link to a web location where the invitee can enter the authentication key to access the resource 302.

When various resource collaborators modify the resource 302, the system 300 maintains a comprehensive resource modification history of the resource 302 in one or more action history records. Such records may include, for example, a sharing list 318, which includes an identifier (e.g., an invitee identifier or identifier relating to a user account) relating to each resource collaborator who has modified the resource 302. When a logged-in user redeems an access credential to gain access to the resource 302, the system 300 adds the identifier of that user to the sharing list and annotates the entry with the original identifier associated with the authentication key.

In the example illustrated, Brad edits the resource 302, and sends Amy an invite for the resource 302. Amy redeems an access credential from the invite by selecting the resource identifier in the invite 316a. Subsequently, Amy edits the resource 302 and forwards the invite 316b (originally from Brad) to another user, Sarah. Using the invite 316b, Sarah may also be able to access the resource 302 without logging in to an account on the resource sharing system 312. However, when Sarah selects the resource identifier in the invite 316b and edits the resource 302, she is already logged in to her own account on the resource sharing system 312.

The sharing list 318 includes a record of each of the above-described editing instances. First, the sharing list 318 includes Brad's email address, which is associated with Brad's account in the resource sharing system 312. Because Brad edited the resource 302 while logged in to his account, the system 300 associated Brad's modifications to the resource 302 with Brad's email address.

The sharing list 318 also includes Amy's email address, which is associated with the access credential generated by the system 300 when it created the invite 316a. Because Amy accessed the resource 302 using the authentication key in the invite 316a, the system 300 associated Amy's modifications to the resource 302 with Amy's email address (i.e., the invitee identifier supplied by Brad).

The sharing list 318 also includes Sarah's email address, which is associated with Sarah's account in the resource sharing system 312. Sarah edited the resource 302 after selecting the resource identifier in the invite 316b forwarded to her by Amy 308. Thus, Sarah used Amy's authentication key to access the resource 302. Under these circumstances, the system 300 may ordinarily associate Sarah's modifications to the resource 302 with Amy's email address. However, Sarah chose to log in to her own account on the resource sharing system 312 before editing the resource 302. Consequently, the system 300 associated Sarah's email address with Sarah's modifications to the resource 302. Additionally, the system 300 determined that Sarah accessed the resource by using Amy's authentication key. Thus, the sharing list 318 indicates that Sarah@live.com accessed the resource 302 via an invitation (e.g., the invitation 316b) from Amy@contoso.com.

The system 300 includes a resource information record 320 that contains information regarding the most recent editing instance of the resource 302. If an anonymous user edits resource 302 using an access credential, then the invitee identifier associated with that access credential may be pulled as the "last modified by" user in the resource information record 320. In the example illustrated, Sarah was logged in to the resource sharing system 312 when she edited the resource 302. Thus, the resource information record 320 indicates that Sarah@live.com last edited the resource 302 via an authentication key that was originally sent to Amy@contoso.com.

If the system 300 records a number of annotations that appear malicious, a resource collaborator tracking the resource 302 can revoke access from the user associated with the malicious resource modifications. For example, if a number of malicious modifications are associated with the invitee identifier "amy@contoso.com," then Amy's permission to edit the resource 302 may be revoked. In some cases, it may be that the malicious edits associated with Amy's email address were not made by Amy, but by one or more individuals who obtained and used Amy's authorization code. In such case, Amy's permission may be revoked, and/or Amy may be issued a new access credential.

Figure 4:
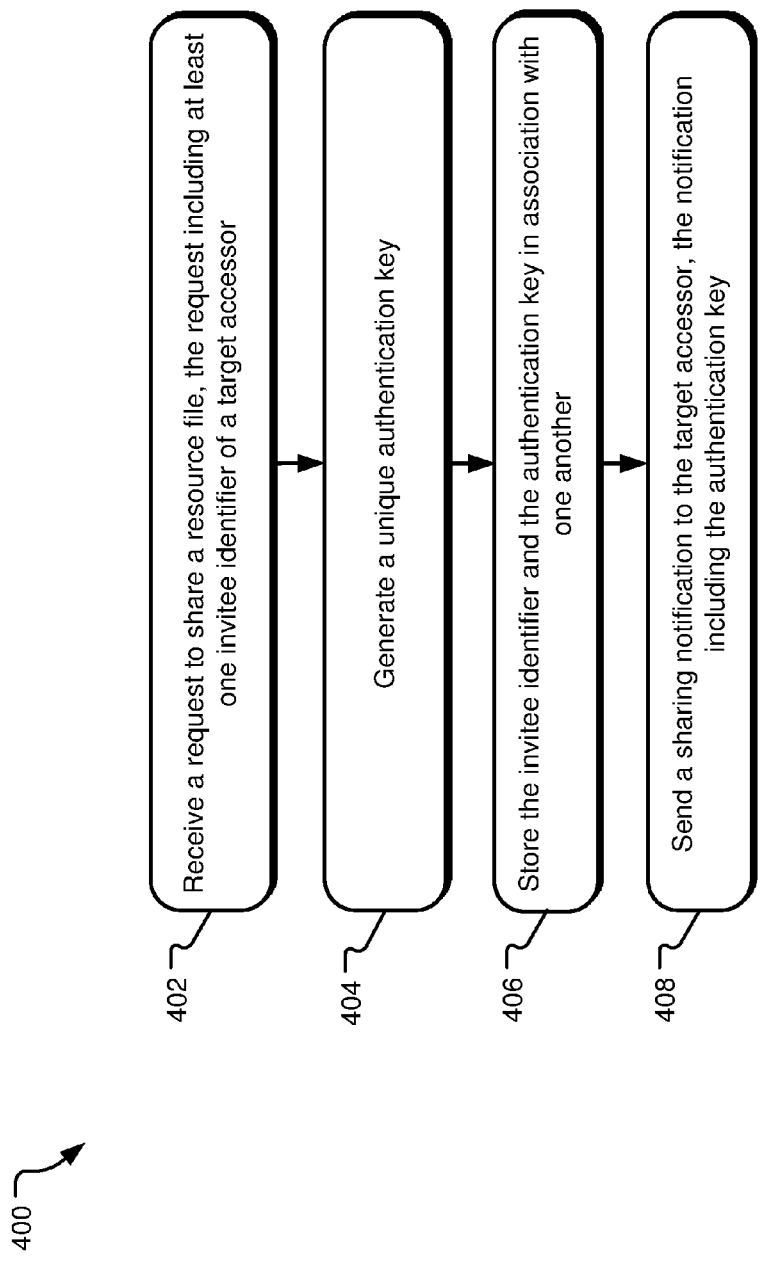
FIG. 4 illustrates example operations for generating an access credential to provide a user with access to a resource using a resource-based action attribution system.

FIG. 4 illustrates example operations 400 for generating an access credential to provide a user with access to a resource using a resource-based action attribution system. In the resource-based action attribution system, a receiving operation 402 receives a request to share a resource, where the request includes at least one invitee identifier of an invitee (i.e., a target accessor). The invitee identifier may be, for example, an email address, an instant messaging screen name, a social networking account identifier, personal website, a phone number, a nickname, etc. An access credential generation operation 404 generates an access credential, such as an authentication key. A storing operation 406 stores the invitee identifier and the access credential in association with one another in memory such that a look-up of the access credential may retrieve the associated invitee identifier received by the receiving operation 402. The storing operation 406 may also store the invitee identifier and the access credential in association with a resource identifier, such as a file name of the resource or a file path to a location of the resource.

In one implementation, the access credential generation operation 404 generates a resource identifier in lieu of, or in addition to, an access credential. The storing operation 406 may store the resource identifier in memory in association with one or more other identifiers (e.g., invitee identifiers) such that a look-up of the resource identifier may retrieve one or more of the associated identifiers.

A sharing operation 408 shares the access credential. In one implementation, the sharing operation 408 shares the access credential with the target accessor by sending the target accessor a notification including the authentication key. In another implementation, the sharing operation 408 sends the target accessor a notification containing a resource identifier, where the resource identifier includes the authentication key. In another implementation, the sharing operation 408 sends the target accessor a notification containing a resource identifier to a web location that prompts the target accessor to enter the authentication key. The notification may assume a variety of forms including, but not limited to, an email, text message, social networking notification, etc.

In yet another implementation, a sharing operation 408 shares the access credential with the target accessor by making information publicly or privately available to the target accessor, such as by sharing the access credential on a website. In yet another implementation, the sharing operation 408 shares the access credential with the target accessor after the target accessor provides self-identifying information, such as an email address.

Figure 5:
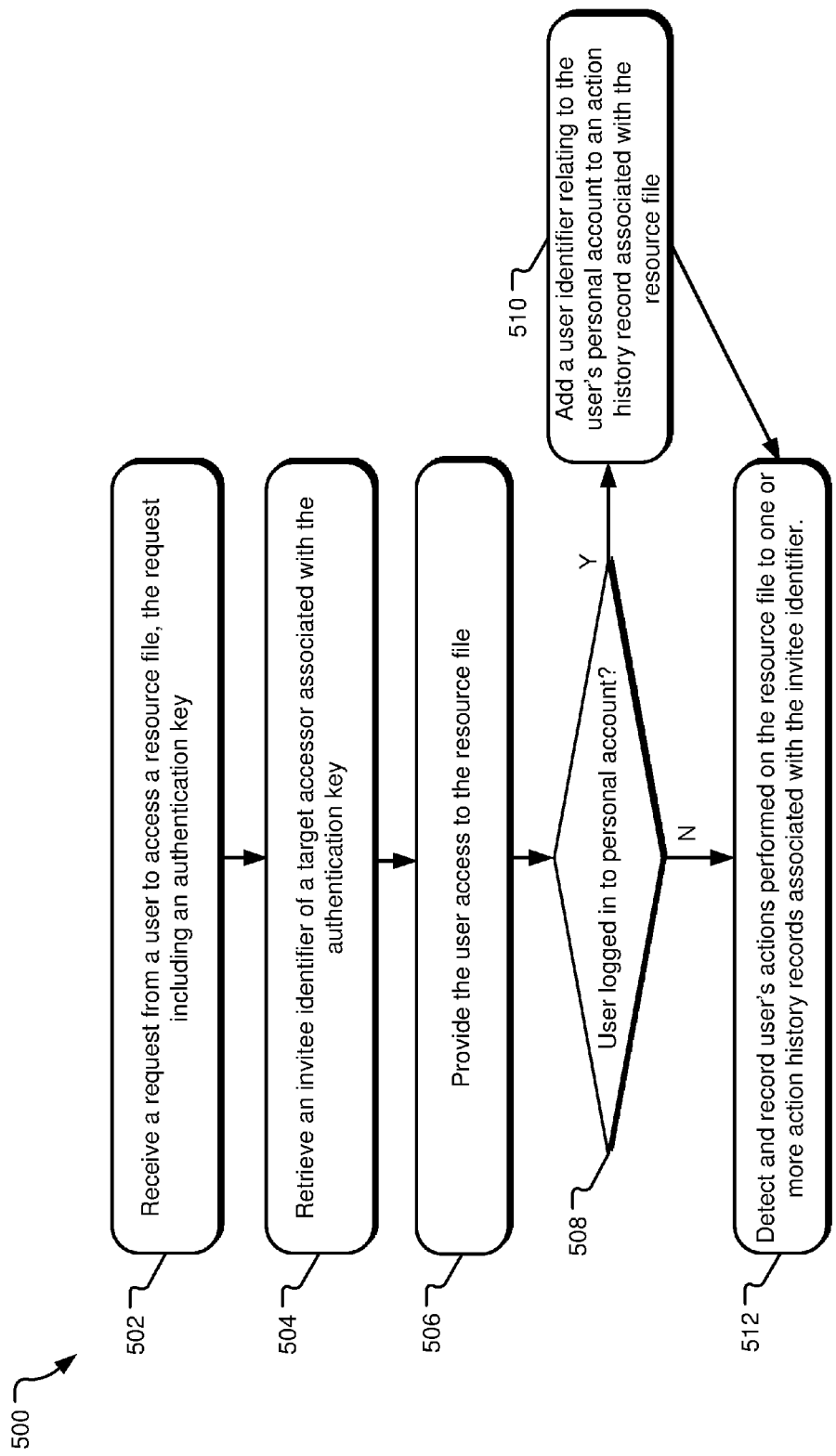
FIG. 5 illustrates example operations for redeeming an access credential to gain access to a resource using a resource-based action attribution system.

FIG. 5 illustrates example operations 500 for redeeming an access credential to gain access to a resource using another resource-based action attribution system. In the resource-based action attribution system, a receiving operation 502 receives a request from a user to access a resource located on a resource sharing system. The request includes an access credential, which may be an authentication key. In one implementation, the request received is a request to access a target domain of a shared resource. The target domain may or may not have an associated resource identifier (e.g., URL) that includes the authentication key. Additionally, the target domain may be stored in a memory location in association with one or more identifiers (e.g., an invitee identifier).

A retrieving operation 504 retrieves an invitee identifier of a target accessor associated with the authentication key. In one implementation, the retrieving operation 504 retrieves the invitee identifier by searching a database for an entry containing the authentication key. The invitee identifier associated with the access credential may include any combination of numerical, alpha, and/or any non-alpha and non-numeric characters, and may be, for example, an email address, an instant messaging screen name, a social networking account identifier, personal website, a phone number, a nickname, etc.

A granting operation 506 grants the user access to the resource. The specific access granted to the user may be restricted according to permissions set by one or more other uses with access to the resource. For example, the user may be permitted to read the resource, but not write to it.

A determination operation 508 determines whether the user requesting access to the resource is logged in to an account on a resource sharing system where the resource is located. If the determination operation 508 determines that the user requesting access is not logged into a personal account on the resource sharing system, then a recording operation 512 adds an annotation to an action history record indicating the invitee identifier and/or authentication key associated with the request. In one implementation, the recording operation 512 tracks the actions made by the user and records such modifications in an action history record associated with the invitee identifier and/or the access credential.

If the determination operation 508 determines that the user requesting access to the resource is logged into an account on the resource sharing system, then another recording operation 510 adds a user identifier of the user's personal account to an action history record associated with the resource. Thereafter, the recording operation 512 adds the invitee identifier associated with the access credential to the same or another action history record.

For example, the determination operation 508 may detect that the user is logged on to an account on the resource sharing system registered to John Jones but has accessed the resource via an access credential associated with an invitee identifier "amy@contoso.com." Such a scenario may result in the case where Amy invited John Jones to edit the resource by forwarding her authentication key to him. In this case, the recording operations 510 and 512 create a number of actions in one or more action history records relating to revisions made by John Jones. Such revisions may have been made during an editing instance when John Jones was not logged in to the resource-sharing system.

Figure 6:
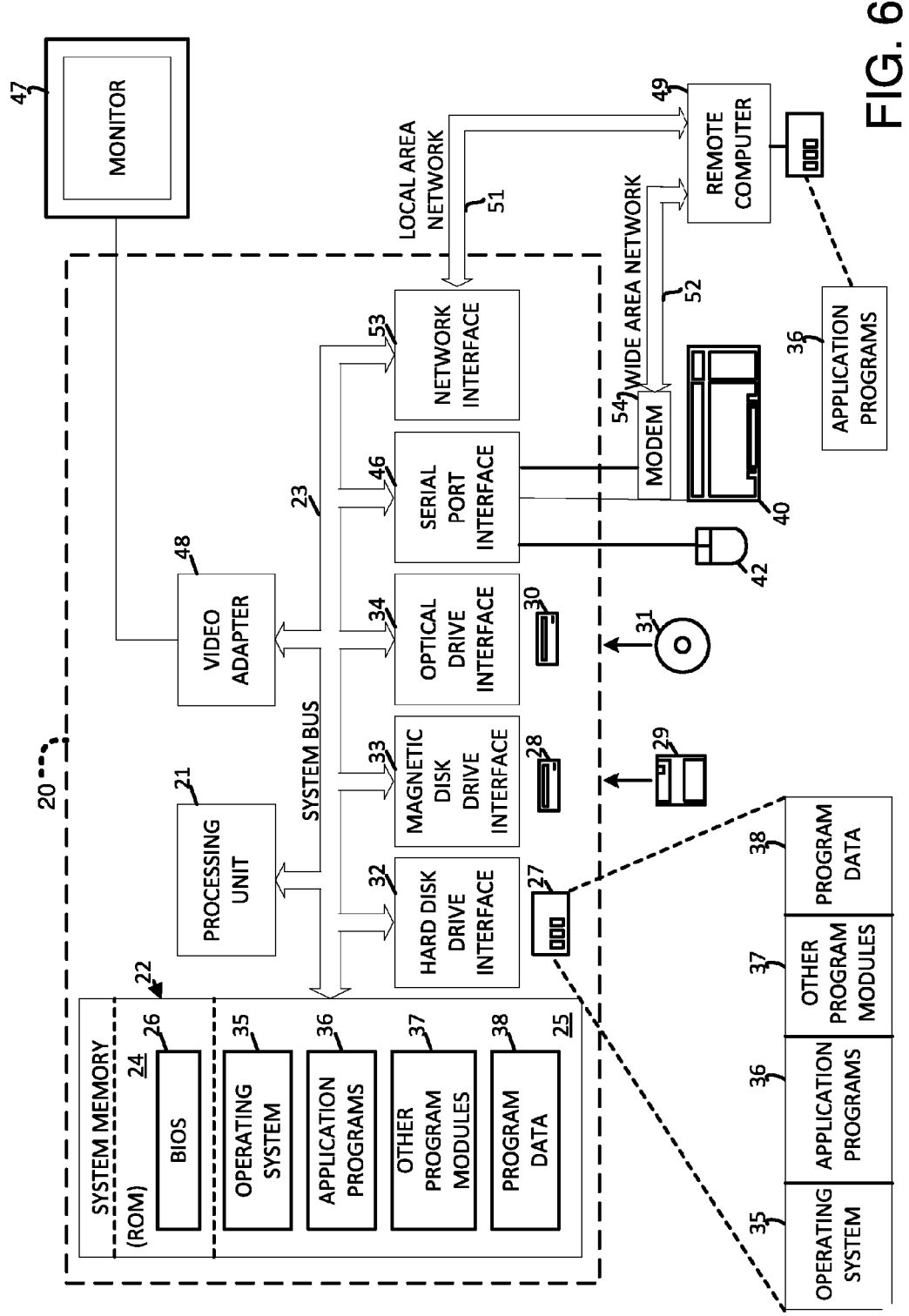
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, a touchpad (e.g., for gesture or touch input) or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions for providing a resource-based action attribution system may be stored in memory 22 and/or storage devices 29 or 31 and processed by the processing unit 21. The shared resources, attribution data, invites, invite identifiers, and other data may be stored in memory 22 and/or storage devices 29 or 31 as persistent datastores.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method of granting a user collaborative access to a resource hosted by a server stored within a resource sharing system, the method comprising:

associating in memory an invitee identifier with the resource, the invitee identifier identifying an account external of the resource sharing system;

communicating an access credential to the user, the access credential associated in memory with the resource and the invitee identifier;

providing access to the resource within the resource sharing system, the access provided subject to authentication of the communicated access credential in association with the invitee identifier;

detecting performance of an action performed by the user on the accessed resource; and responsive to detecting the performance of the action, recording via a hardware processing unit attribution data in association with the accessed resource to track the attribution data relating to the action performed on the accessed resource, wherein the attribution data refers to the action and includes at least the invitee identifier in association with the action.

2. The method of claim 1 wherein the detected action is an editing action.

3. The method of claim 1 wherein the account external of the resource sharing system belongs to the user and the user does not have an account on the resource sharing system.

4. The method of claim 1 wherein the attribution data includes a user identifier internal to the resource sharing system, the internal user identifier identifying another user with permission to invite the user to access the resource, the attribution data further including at least one history record designating the internal user identifier and another action performed on the resource.

5. The method of claim 1 wherein the attribution data includes at least one history record designating the action and the invitee identifier.

6. The method of claim 1 wherein the attribution data includes a sharing list including at least one invitee identifier.

7. The method of claim 1 wherein the attribution data includes a resource information record associated with the action, the resource information record identifying the invitee identifier.

8. The method of claim 1 wherein communicating the access credential to the user is performed by another user from an account internal to the resource sharing system.

9. One or more computer-readable storage media devices encoding computer-executable instructions for executing on a computer system a computer process for granting a user collaborative access to a resource hosted by a server stored within a resource sharing system and the computer process comprises:

associating in memory an invitee identifier with the resource, the invitee identifier identifying an account external of the resource sharing system;

communicating an access credential to the user, the access credential associated in memory with the resource and the invitee identifier;

providing access to the resource stored within the resource sharing system, the access provided subject to authentication of the communicated access credential in association with the invitee identifier;

detecting performance of an action performed by the user on the accessed resource; and responsive to detecting the performance of the action, recording via a hardware processing unit attribution data in association with the accessed resource to track the attribution data relating to the action performed on the accessed resource, wherein the attribution data refers to the action and includes at least the invitee identifier in association with the action.

10. The one or more tangible computer-readable storage media devices of claim 9 wherein the detected action is an editing action.

11. The one or more computer-readable storage media devices of claim 9 wherein the account external of the resource sharing system belongs to the user and the user does not have an account on the resource sharing system.

12. The one or more tangible computer-readable storage media devices of claim 9 wherein the attribution data includes a user identifier internal to the resource sharing system, the internal user identifier identifying another user with permission to invite the user to access the resource, the attribution data further including at least one history record designating the internal user identifier and another action performed on the resource.

13. The one or more tangible computer-readable storage media devices of claim 9 wherein the attribution data includes at least one history record designating the action and the invitee identifier.

14. The one or more tangible computer-readable storage media devices of claim 9 wherein the attribution data includes a sharing list including at least one invitee identifier.

15. The one or more tangible computer-readable storage media devices of claim 9 wherein the attribution data includes a resource information record associated with the action, the resource information record identifying the invitee identifier.

16. An action attribution system for granting a user collaborative access to a resource, the action attribution system comprising:

a resource sharing system including a server hosting the resource and also including a hardware processing unit configured to:

associate in memory an invitee identifier with the resource, the invitee identifier identifying an account external of the resource sharing system;

receive an access credential from the user, the access credential associated in memory with the resource and the invitee identifier; and provide the user with access to the resource subject to authentication of the received access credential in association with the invitee identifier; and a datastore configured to store attribution data in association with an action performed on the accessed resource by the user to track the attribution data relating to the action performed on the accessed resource, wherein the attribution data refers to the action and includes the invitee identifier in association with the action.

17. The action attribution system of claim 16 wherein the account external of the resource sharing system belongs to the user and the user does not have an account on the resource sharing system.

18. The action attribution system of claim 16 wherein the attribution data includes a user identifier internal to the resource sharing system, the internal user identifier identifying another user with permission to invite the user to access the resource.

19. The action attribution system of claim 18 wherein the attribution data further includes at least one history record designating the internal user identifier and another action performed on the resource.

20. The action attribution system of claim 16 wherein the attribution data includes at least one history record designating the action and the invitee identifier.

* * * * *